United States Patent [19]

Masaki

[11] Patent Number: 4,782,473

[45] Date of Patent: Nov. 1, 1988

[54] DRIVE CONTROL METHOD FOR MULTI-DISK PLAYER

[75] Inventor: Naoki Masaki, Saitama, Japan

[73] Assignee: Pioneer Electronic Corporation, Tokyo, Japan

[21] Appl. No.: 111,331

[22] Filed: Oct. 22, 1987

[30] Foreign Application Priority Data

Oct. 22, 1986 [JP] Japan .................................. 61-249492

[51] Int. Cl.⁴ .............................................. G11B 17/22
[52] U.S. Cl. ........................................ 369/34; 369/36; 369/292
[58] Field of Search ...................... 369/34, 36, 37, 38, 369/39, 292

[56] References Cited

U.S. PATENT DOCUMENTS

| | | | |
|---|---|---|---|
| 3,644,028 | 2/1972 | Rube | 353/114 |
| 4,370,738 | 1/1983 | Coleman | 369/77.2 |
| 4,682,319 | 7/1987 | Einhaus | 369/75.2 |

*Primary Examiner*—Steven L. Stephan
*Attorney, Agent, or Firm*—Sughrue, Mion, Zinn, Macpeak & Seas

[57] ABSTRACT

A method for operating a disk player to eliminate jammed disks and allow continued playing. When it is sensed that a disk after completing playing has not been returned to its magazine, the disk moving mechanism is operated to try to move the disk in the direction so as to pull it out of the magazine. This usually frees the disk and allows playing of the next disk in sequence. If, however, the disk is not then returned to the magazine, the player is disabled.

3 Claims, 2 Drawing Sheets

000
DRIVE CONTROL METHOD FOR MULTI-DISK PLAYER

BACKGROUND OF THE INVENTION

The present invention relates to a drive control method for a multi-disk player in which a plurality of disks housed in a magazine are extracted from the magazine one by one for playing.

A multi-disk player in which a plurality of compact disks are housed in a magazine and the disks are sequentially extracted and played has been proposed, manufactured, and placed on the market by the present applicant. The structure of this multi-disk player is described in detail in Japanese Patent Application No. 219603/85 filed by the present application.

FIG. 1 shows the basic construction of the multi-disk player. Shown at 1 in FIG. 1 is a magazine in which six disks 3 are housed. Six trays 2 are fitted in the magazine 1 in such a manner that the trays can be moved into and out of the magazine. When the disks 3 are housed in the magazine 1, the disks are engaged in the trays 2. Each tray 2 is pulled out of the magazine 1 by a tray moving mechanism 4 so that the disk 3 in the extracted tray is aligned with the spindle of a motor 5. The spindle then clamps the disk and rotates the disk while being servo-controlled so that a tune recorded on the disk can be reproduced through an optical pickup (not shown). After the disk 3 has finished playing, the disk is put back into the tray 2 and the tray is housed back in the magazine 1 by operation of the tray moving mechanism 4. Shown at 6, 7 and 8 in FIG. 1 are, respectively, a motor for driving the tray moving mechanism 4, a motor drive circuit for driving the motor 6, and a controller which sends control signals to the motor drive circuit 7. A home position detecting switch 9 for generating an output when the tray 2 is housed in the magazine and a clamped position detecting switch 10 for generating an output when the disk is clamped by the spindle motor 5 are connected to the controller 8.

However, when the disk 3 is to be returned to the magazine 1 after playing is completed, the disk may sometimes collide against a part of the magazine, making it impossible to operate the tray moving mechanism 4. Such an event may occur, for example, due to tilting of the player or to an external shock. If it is impossible to operate the tray moving mechanism 4, there is a problem in that the disk cannot be changed for another, and manual intervention is required to free the mechanism.

SUMMARY OF THE INVENTION

The present invention was made in consideration of the above-mentioned problem.

Accordingly, it is an object of the present invention to provide a multi-disk player in which abnormalities in the disk changing action are automatically eliminated.

In accordance with the present invention, a multi-disk player controller is operated in accordance with an abnormality elimination method inclusive of a first step of reverse driving in such a direction as to pull a disk out of a magazine when the return of the disk into the magazine is not completed within a prescribed time, and a second step of driving to return the disk into the magazine after the disk is pulled out of the magazine in the first process.

DESCRIPTION OF THE PREFERRED EMBODIMENTS

Figure 1:
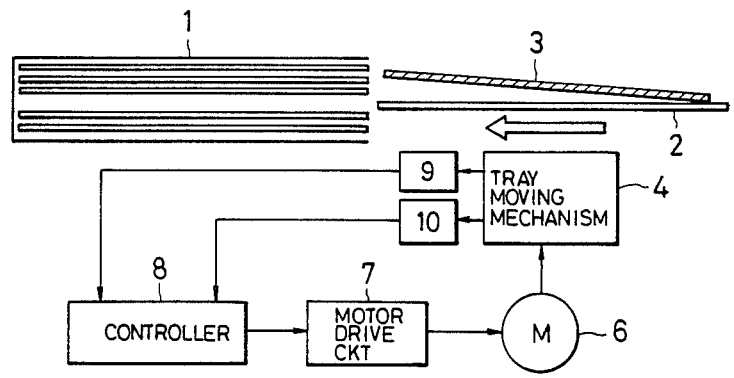
FIG. 1 is a schematic view of a multi-disk player to which an abnormality elimination method according to the present invention is applied.

A preferred embodiment of the present invention will hereafter be described with reference to the attached drawings.

When a reproduced disk 3 is to be changed for another disk to reproduce the latter, as a first step, a controller 8 issues a command to a motor drive circuit 7 to rotate a motor 6 to drive a tray moving mechanism 4 backward (step 1). It is then waited for a prescribed time (X seconds) in steps 2 and 3 for a tray 2 carrying the reproduced disk 3 to be returned to a magazine 1 and a home position detecting switch 9 to be turned on. When the tray 2 is returned to the home position 1 within the prescribed time, steps 6 to 22 are employed.

However, if the disk 3 collides against the magazine due to tilting of the player, an external shock, or the like, the tray 2 bearing the disk cannot reach the home position within the prescribed time, thus making the player inoperative. In this case, step 4 is executed. If this is the first instance of such failure, an NG flag is set in step 5 to control the motor drive circuit 7 to stop moving the disk 3 in a step 25. A step 10 is thereafter executed to control the motor drive circuit 7 to move the tray 2 in such a direction as to pull the tray away from the magazine 1 to remove the disk 3 from the jammed position with the magazine.

Figure 2A:
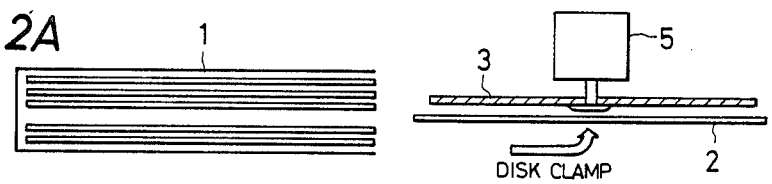
FIGS. 2A to 2D show states of operation of the multi-disk player.
Figure 2B:
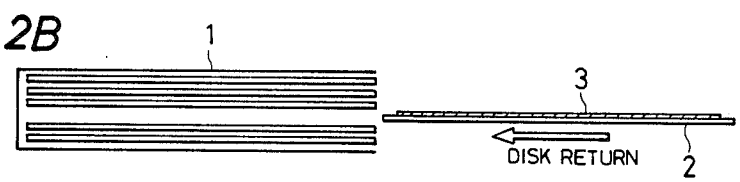

It is then waited for the prescribed time (X seconds) in steps 11 and 12 for the disk 3 to be clamped by the spindle of the motor 5 and for the clamped position detecting switch 10 to be turned on. Thus, the disk 3 and the magazine 1 are removed from collision contact with each other, and the disk is subsequently clamped by the spindle of the motor 5, as shown in FIG. 2A. After that, steps 16 and 17 are executed. In these steps, if the playback display of the player is off or the currently clamped disk 3 is not the one to be reproduced next, step 1 is executed again to perform a disk return operation, as shown in FIG. 2B.

Figure 2C:
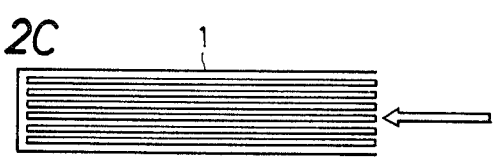

Since the disk 3 is thus properly located on the tray 2, the disk is normally returned to the home position, as shown in FIG. 2C, whereupon step 6 is executed.

If the disk 3 is not returned to the home position within the prescribed time, since this constitutes the second failure, a skip is made to step 23 to stop the movement of the tray 2 where it is and to turn off the playback display, hence placing the player out of operation.

Figure 2D:
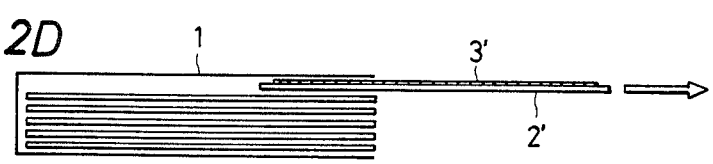
Figure 3:
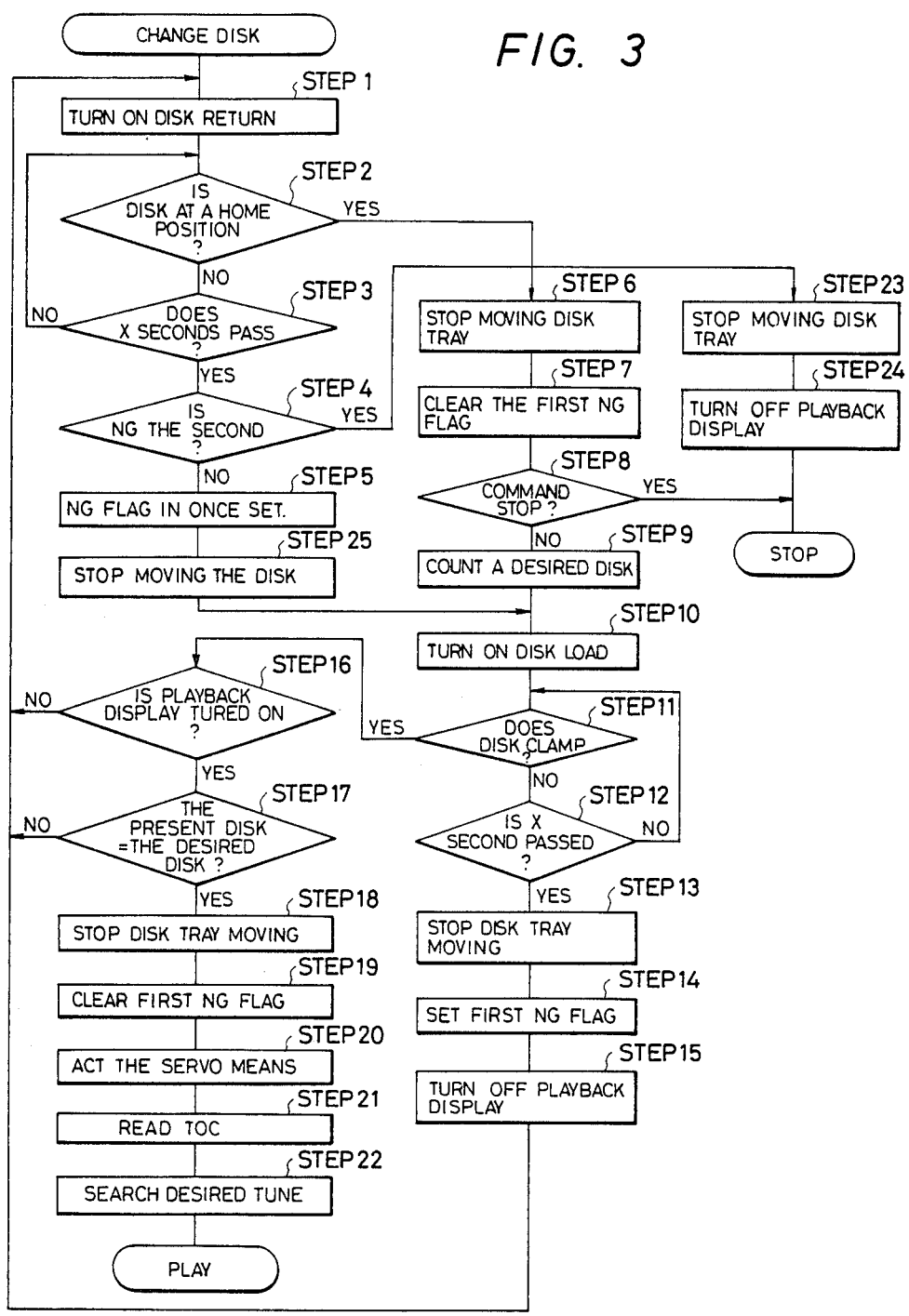
FIG. 3 is a flowchart of the inventive abnormality elimination method.

In step 6, the return of the tray 2 is stopped, and in step 7 the first NG flag is cleared. Hence, if a command not for disk change but for reproduction stoppage has already been issued, the player is deactivated. If a command for disk change has already been issued, step 9 is carried out to use a disk selection mechanism (not shown in the drawings) to select another disk 3' through counting. A tray 2' bearing the disk 3' is then moved in step 10, as shown in FIGS. 2D, in such a direction as to clamp the disk. It is then waited in step 11 for the disk 3′ to be clamped by the spindle of the motor 5.

After the disk 3 has been clamped by the spindle of the motor 5, steps 16 and 17 are executed, and, since the playback display of the multi-disk player is on and the number of the disk is the same as that of the one to be played next, steps 18, 19, 20, 21 and 22 are carried out to put the tray moving mechanism 4 out of operation and clear the above-mentioned first NG flag. At the some time, the servo controlling the motor 45, etc., is activated to read recorded tune number information recorded on the innermost portion of the recording area of the disk to search for a desired tune and to reproduce it.

Although the above-described embodiment relates to a multi-disk player for compact audio disks, the present invention is not limited thereto, but may be also applied to a multi-disk player for video disks or a recording/reproduction device in which a plurality of recording media can be exchanged and played by movement between a housed position and a playing position.

According to the present invention, a controller of the disk player is operated in accordance with an abnormality elimination method in which it is first detected that a disk cannot be properly returned to its magazine for exchange with another disk, the tray bearing the disk is then returned to a clamped position, and the disk is thereafter returned to the magazine. Accordingly, if the disk collides against the magazine and becomes jammed thereagainst so that the disk cannot be returned to the magazine, the jammed condition is automatically released. As a result, the reliability of the player is significantly enhanced.

What is claimed is:

1. In drive control method for a multi-disk player in which a plurality of disks are housed in a magazine and said disks are sequentially extracted from said magazine and played, in which player there are provided a disk changing mechanism which pulls said disk out of said magazine and returns said disk into said magazine, a motor for driving said mechanism, a motor drive circuit for driving said motor, and a controller which supplies a control signal to said motor drive circuit are provided, the improvement comprising the steps of: performing reverse driving of a disk having completed playing in a direction to pull said disk out of said magazine if the return of said disk to said magazine is not completed within a predetermined time after said disk has completed playing, and returning said disk into said magazine after said disk is pulled out of said magazine.

2. The method of claim 1, further comprising the step of rendering said player inoperative if, after said step of reverse driving, said disk is not returned to said magazine within said predetermined time, to deactivate further operations of said player.

3. The method of claim 1, wherein said disk is carried by a tray.

* * * * *